United States Patent [19]

Mizuno et al.

[11] Patent Number: 5,004,968
[45] Date of Patent: Apr. 2, 1991

[54] METHOD FOR ACCELERATION AND DECELERATION CONTROL OF SERVOMOTORS

[75] Inventors: Toru Mizuno, Tama; Ryuichi Hara, Oshino, both of Japan

[73] Assignee: Fanuc Ltd., Minamitsuru, Japan

[21] Appl. No.: 381,396

[22] PCT Filed: Dec. 9, 1988

[86] PCT No.: PCT/JP88/01241
§ 371 Date: Jul. 5, 1989
§ 102(e) Date: Jul. 5, 1989

[87] PCT Pub. No.: WO89/06066
PCT Pub. Date: Jun. 29, 1989

[51] Int. Cl.$^5$ .............................................. H02P 5/00
[52] U.S. Cl. .................... 318/615; 318/616; 318/618; 318/571; 364/169; 364/174
[58] Field of Search ................... 318/560–638; 364/513, 180, 169, 174; 901/9, 13, 15, 19–24

[56] References Cited

U.S. PATENT DOCUMENTS

| | | | |
|---|---|---|---|
| 4,473,786 | 9/1984 | Miyashita et al. | 318/618 X |
| 4,543,625 | 9/1985 | Nozawa et al. | 364/174 X |
| 4,554,497 | 11/1985 | Nozawa et al. | 318/571 X |
| 4,558,265 | 12/1985 | Hayashida et al. | 318/618 X |
| 4,600,985 | 7/1986 | Nozawa et al. | 364/180 X |
| 4,603,286 | 7/1986 | Sakano | 318/572 X |
| 4,606,489 | 8/1986 | Steinhart et al. | 318/632 X |
| 4,683,543 | 7/1987 | Hirasawa et al. | 318/573 X |
| 4,706,003 | 11/1987 | Nakashima et al. | 318/636 X |
| 4,728,872 | 3/1988 | Kishi et al. | 318/567 X |
| 4,815,007 | 3/1989 | Sakai et al. | 364/513 |

Primary Examiner—Paul Ip
Attorney, Agent, or Firm—Staas & Halsey

[57] ABSTRACT

A method for acceleration and deceleration control of servomotors always brings out the maximum operating capability of a machine equipped with servomotors, such as a robot, NC machine tool, etc. and accurately moves a respective operating section of the machine, e.g., robot work point, tool, etc., along a commanded path. When a command is read from a program, the speed command value is divided by a maximum allowable (Am) of the machine, set previously, to determine a time constant (T) for acceleration and deceleration control (Step S2), and the time constant is divided by a sampling period to obtain a number (n) of times of commanded speed sampling (Step S3). The servomotor is driven at a controlled speed after the acceleration/deceleration process. The controlled speed is obtained by dividing a sum of a commanded speed of the current sampling period and commanded speeds sampled in the previous (n−1) periods preceding the current period, by the number (n) of times of sampling. Thus, accelerated and decelerated operations of the machine are always performed at the maximum allowable acceleration/deceleration, whereby the maximum operating capability of the machine is available and the respective machine operating section can be moved accurately along the commanded path.

11 Claims, 3 Drawing Sheets

METHOD FOR ACCELERATION AND DECELERATION CONTROL OF SERVOMOTORS

TECHNICAL FIELD

The present invention relates to a method for an acceleration and deceleration control of servomotors which drive operating sections of various machines, and more particularly, to a method for an acceleration and deceleration control of servomotors, which is capable of effecting accelerated and decelerated machine operations at a maximum allowable acceleration/deceleration.

BACKGROUND ART

In various kinds of machines such as industrial robots, NC machine tools and the like, a required number of servomotors mounted thereon are employed to drive operating sections of the respective machine along or around corresponding control axes. At the time of starting and ending the drive of the respective operating section by an associated servomotor, and also at the time when a command value of operation speed of the servomotor is changed, acceleration/deceleration control of the servomotor is automatically performed to prevent the machine from undergoing overload or vibration.

In simultaneous multi-axis control for a machine, shown by way example in FIGS. 1 to 3, a movement command value per unit time, i.e., a commanded speed Pa, for a respective control axis in each period of a sampling operation of a commanded speed, which operation is effected at predetermined intervals of time, is determined by a computer or an interpolation and distribution control unit (not shown). Then, in an acceleration/deceleration control unit 1 receiving a first pulse train which corresponds to the commanded speed Pa after interpolation (indicated by the dashed line), linear acceleration/deceleration control of FIGS. 2 and 3, or exponential acceleration/deceleration control (not shown) is carried out with a time constant of T, so as to supply a servo control unit 2 for driving a servomotor 3 with a second pulse train corresponding to a commanded speed Pb after acceleration/deceleration control (only the commanded speed after linear acceleration/deceleration control is shown by the solid line).

According to the aforementioned conventional acceleration/deceleration control, the above-mentioned object of preventing overload, etc. can be achieved. However, the time constant T with which the acceleration/deceleration control is carried out is preset to such a value that the machine is operated at the maximum allowable acceleration/deceleration when the commanded speed Pa assumes its maximum value. Thus, the time constant is invariable regardless of whether the commanded speed Pa is large (FIG. 2) or small (FIG. 3). As a result, the machine is operated at the maximum allowable acceleration/deceleration only when the maximum commanded speed is generated, and in other cases, the acceleration at which the machine is operated becomes smaller with a decrease of the commanded speed. Thus, the maximum operating capability of the machine cannot be used and the operating time required (cycle time) increases.

Furthermore, when an operating section of a machine, such as a tool provided in a machine tool, work point of a robot, etc. is moved along a corner, its actual movement path is rounded and displaced from the commanded movement path. For example, in order to move the machine operating section first in the X-axis direction and then in the Y-axis direction, as indicated by the dashed line in FIG. 5, if an X-axis direction movement command of the speed Pa and a Y-axis movement command of the speed Pa are applied in the mentioned order, as indicated by the dashed lines in FIG. 4, then the acceleration/deceleration control unit 1 delivers a commanded speed Pb for the X axis and that for the Y axis in sequence, as indicated by the solid lines in FIG. 4. As a consequence, the machine operation section is accelerated in the Y-axis direction while it is decelerated in the X-axis direction, and accordingly its movement path is rounded, as indicated by the solid line in FIG. 5. The radius of the round becomes greater as the time constant T increases.

DISCLOSURE OF THE INVENTION

An object of the present invention is to provide a method for acceleration and declaration control of servomotors, which is capable of utilizing at all times the maximum operating capability of various machines equipped with servomotors.

Another object of the present invention is to provide a method for an acceleration and deceleration control of servomotors, which is capable of moving operating sections of various machines equipped with servomotors, exactly along a commanded path.

To achieve the above objects, according to the present invention, a method for an acceleration and deceleration control of servomotors comprises the steps of: (a) sampling a commanded speed for at least one servomotor, preferably for each of at least two servomotors, mounted to a machine, at predetermined intervals; (b) dividing a value of a speed command by a maximum allowable acceleration/deceleration of the machine, which is set beforehand, when the speed command is read from a program, to determine a time constant with which acceleration/deceleration control is carried out; and (c) carrying out acceleration/deceleration control in accordance with the thus determined time constant and the commanded speed which is sampled.

As described above, according to the acceleration and deceleration control method of the present invention, since acceleration and deceleration of at least one servomotor, preferably, each of at least two servomotors mounted to a machine are controlled with the time constant determined by dividing the speed command value by the maximum allowable acceleration/deceleration of the machine, it is possible to make the best use of the operating capability of various machines such as robots, machine tools and the like, and thus the required operating time of the machines can be shortened. Furthermore, the round of the movement path of the machine operating section such as a work point of a robot, tool of a machine tool, etc., which is created when the operating section is moved along a corner, can be reduced, whereby the machine operating section can be controlled to move accurately along the commanded path.

BEST MODE FOR CARRYING OUT THE INVENTION

A machine such as a robot, NC machine tool or the like (not shown) to which a method for acceleration and deceleration control of servomotors according to the present invention is applied, comprises a control system (not show), which consists of a microcomputer, for example. Basically, the control system is constructed in a manner similar to that of a conventional one. However, the control system of the present invention is so arranged that its memory is stored with a maximum allowable acceleration/deceleration Am for the machine, preferably, for respective control axis associated with each operating section of the machine, the maximum allowable acceleration/deceleration being determined in dependence on the type of the machine, as distinct from the conventional control system in which a time constant T for acceleration/deceleration control is stored in its memory.

Figure 9:
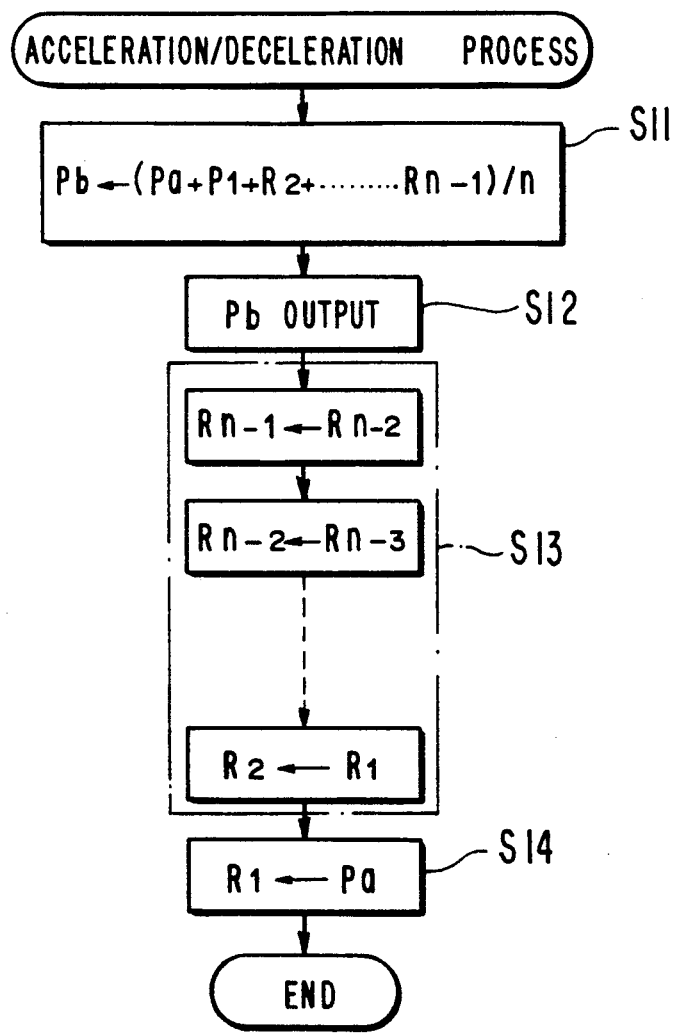
FIG. 9 is a flowchart showing an acceleration/deceleration process executed after the process of FIG. 8.
Figure 8:
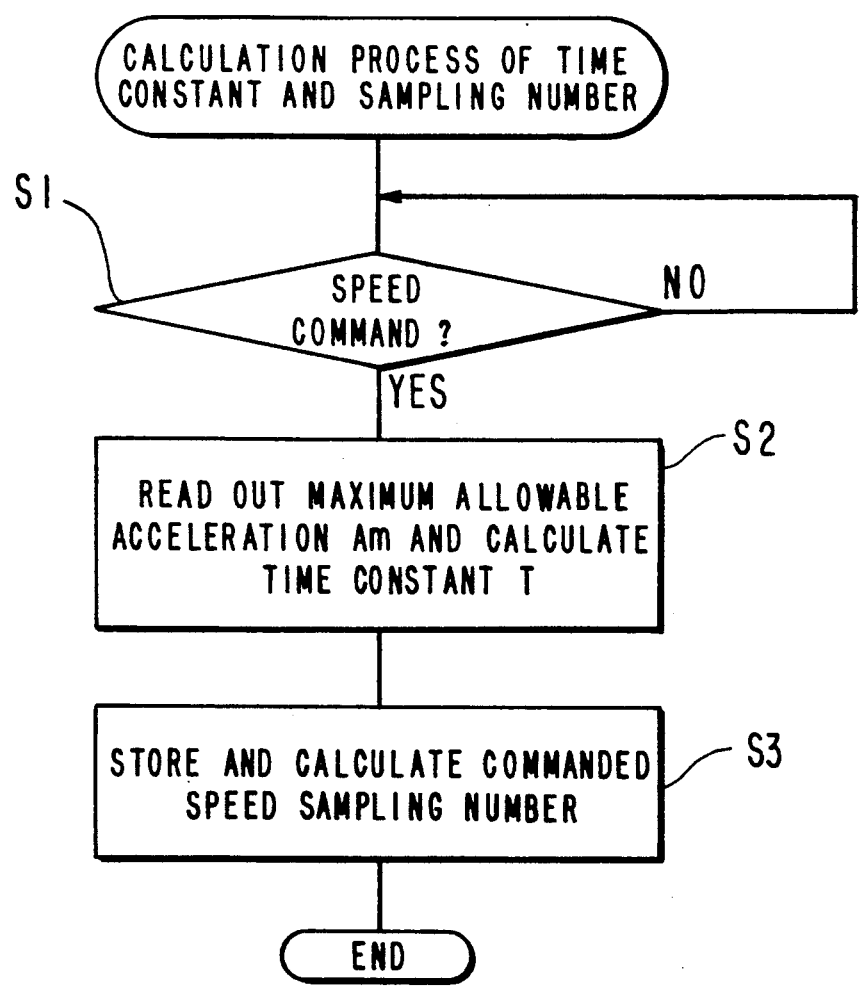
FIG. 8 is a flowchart of a calculating process of a time constant and a sampling number for the acceleration/deceleration control of FIGS. 6 and 7.

With reference to FIGS. 8 and 9, an explanation will be given as to the acceleration and deceleration control method according to an embodiment of the present invention.

Figure 1:
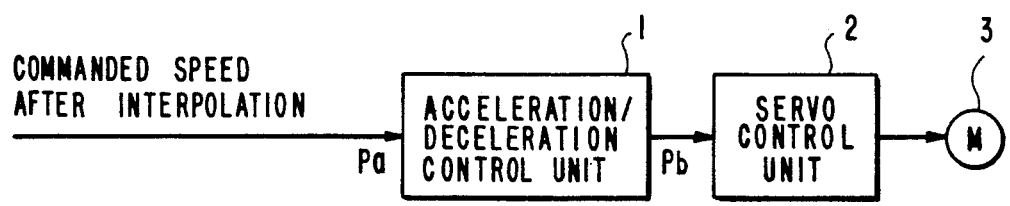
FIG. 1 is a schematic block diagram illustrating an acceleration/deceleration control unit used for acceleration/deceleration control of servomotors, and its peripheral elements.
Figure 2:
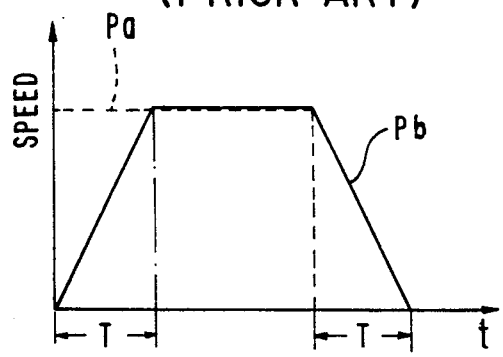
FIG. 2 is a chart illustrating a commanded speed before and after acceleration/deceleration control according to a conventional acceleration/deceleration control method, when the commanded speed is large.
Figure 3:
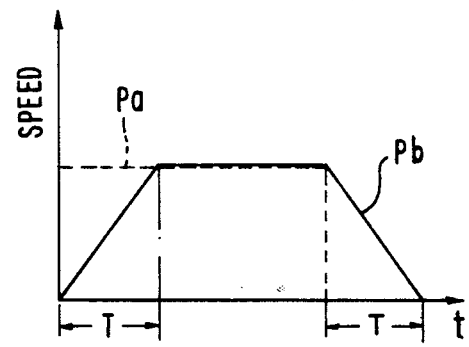
FIG. 3 is a chart similar to FIG. 2 but in the case in which the commanded speed is small.
Figure 4:
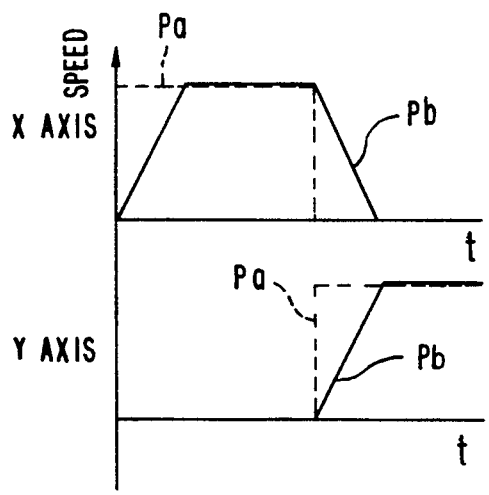
FIG. 4 is a chart illustrating commanded speeds in X-axis and Y-axis directions before and after acceleration/deceleration control according to the prior art method, when a machine operating section is moved along a corner.
Figure 5:
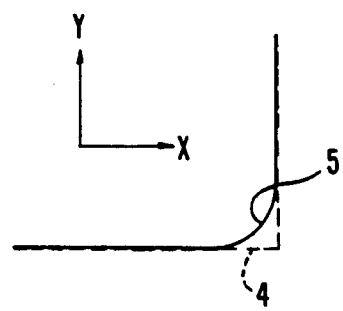
FIG. 5 is a diagram illustrating an actual movement path according to the control of FIG. 4, and a commanded movement path.

First, a central processing unit of the microcomputer, having similar functions to those of the acceleration/deceleration control unit 1 of FIG. 1, reads out a speed command from a machine operation control program (Step S1 in FIG. 8). The central processing unit then reads out, from the memory of the microcomputer, the maximum allowable acceleration/deceleration Am, stored therein beforehand, of a machine operating section associated with a respective control axis corresponding to the speed command, and divides the speed command value F by the value Am to determine the time constant T ($=F/Am$) for acceleration/deceleration control (Step S2). Subsequently, the central processing unit determines an integer closest to a value $T/\tau$ obtained by dividing the time constant T by a commanded speed sampling period $\tau$, or an integer smaller than and closest to the value $T/\tau$, as a number n ($=T/\tau$) of times by which commanded speed sampling is performed within the time constant T, and stores the obtained value in a predetermined register built in the central processing unit (Step S3). To calculate the value n, the value F may be divided by the product of the values Am and $\tau$.

Next, the central processing unit executes an acceleration/deceleration process shown in FIG. 9, in each commanded speed sampling period $\tau$. For the sake of simplicity, the acceleration/deceleration process will be described for one of the control axes of the machine corresponding to the speed command. At the time of the commanded speed sampling, the central processing unit adds together the commanded speed Pa for the control axis concerned, obtained by an interpolation as conventionally known, and values R1 to Rn−1 sampled at the previous sampling to an nth sampling preceding the current one for this control axis, respectively, and stored in the first to (n−1)th registers of the central processing unit at the current sampling, respectively, and divides the sum (Pa+R1+R2+. . . +Rn−1) by the above-mentioned number n of times of sampling, to obtain the commanded speed Pb after acceleration/deceleration process (Step S11). The commanded speed Pb is sent to a servo-circuit (not shown) associated with the above control axis and corresponding to the servo control unit 2 in FIG. 1 (Step S12). Subsequently, the central processing unit transfers the values Rn−2 to R1, stored respectively in the (n−2)th through the first registers, to the (n−1)th through the second registers, respectively (Step S13), and stores the value Pa in the first register (Step S14), thereby completing the acceleration/deceleration process of the current commanded speed sampling for one control axis.

Thereafter, a similar process to the above is carried out in each sampling period $\tau$. A similar process is also executed for the other control axes corresponding to the above speed command.

The above-mentioned step S11 will now be described in more detail. Let it be assumed that the commanded speed Pa for one of the control axes corresponding to the above speed command is 100 and the number of times of sampling, n, is 5, for example. In this case, the values R1 to R4 stored in the first to fourth registers during the first sampling period are all "0", and accordingly the commanded speed Pb after the acceleration/deceleration process for the control axis concerned is obtained as: $100/5=20$. In the second sampling period, Pa=100, R1=100 and R2 to R4 are all "0", and accordingly Pb=$(100+100)/5=40$. Similarly, the command speeds Pb for the third to fifth sampling periods are 60, 80 and 100, respectively. In this manner, an accelerated operation is carried out for one control axis. In the subsequent periods, the commanded speed Pb after acceleration/deceleration process is maintained at 100 as far as the commanded speed Pa is 100, and in which case the servomotor corresponding to the servomotor 3 of FIG. 1 is operated at a constant speed.

If the commanded speed Pa for the control axis concerned becomes "0", the commanded speed Pb after acceleration/deceleration process is obtained as: $(0+100+100+100=100)/5=80$, in the first sampling period after the change of the commanded speed Pa. The command speeds Pb for the subsequent four sampling periods are 60, 40, 20 and 0, respectively, so that a decelerated operation is carried out. Thereafter, the commanded speed pb is maintained at "0" as far as the commanded speed Pa is "0".

Figure 6:
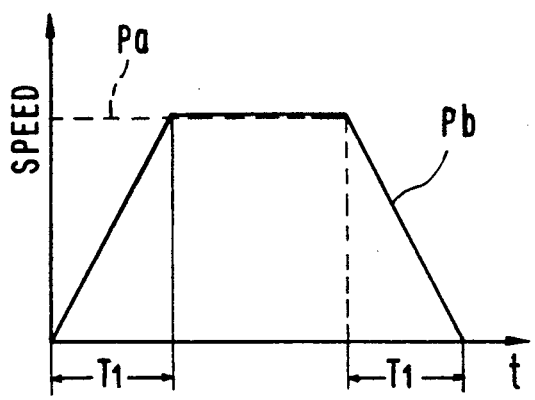
FIG. 6 is a chart illustrating a commanded speed before and after acceleration/deceleration control in an acceleration/deceleration control method according to an embodiment of the present invention, when the commanded speed is large.
Figure 7:
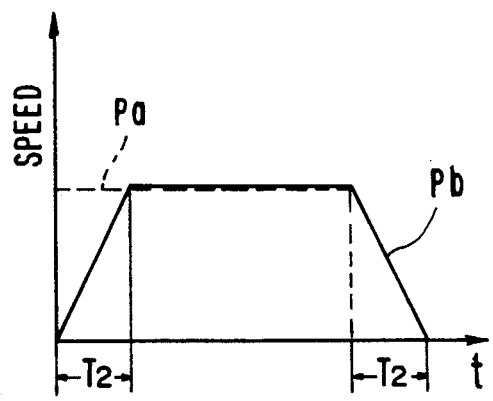
FIG. 7 is a chart similar to FIG. 6 but in the case in which the commanded speed is small.

As described above, accelerated and decelerated operations of the servomotor are carried out with the time constant T (=nτ) which is variable in accordance with the commanded speed Pa. More particularly, these operations are carried out on the basis of the time constant T, which becomes smaller in proportion to the commanded speed Pa as the value Pa decreases (T2<T1 in FIGS. 6 and 7), and the number n of times of sampling. Consequently, the servomotor is driven such that the accelerated and decelerated operations of the associated machine operating section, e.g., a tool, robot work point, et., are always carried out at the maximum allowable acceleration/deceleration. Hence, the cycle time during operation of the machine and the round of the movement path of the machine operating section at a corner can be reduced.

In the above embodiment, only the linear acceleration/deceleration control is described, but the present invention is not limited to this type control alone. For example, exponential acceleration and deceleration control may be used.

We claim:

1. A method for controlling acceleration and deceleration of at least one servomotor mounted to a machine, said method comprising the steps of:
   (a) sampling, at a predetermined sampling period, a commanded speed for the servomotor;
   (b) varying a time constant for acceleration/deceleration control by dividing the commanded speed sampled in step (a) by a predetermined maximum allowable acceleration/deceleration of the machine after the commanded speed is sampled in step (a); and
   (c) controlling acceleration/deceleration of the at least one servomotor in accordance with the time constant varied in step (b) and the commanded speed sampled in step (a).

2. A method according to claim 1, wherein said sampling in step (a) samples the commanded speed for at least two servomotors.

3. A method according to claim 1, wherein said varying of the time constant in step (b) divides the commanded speed by the maximum allowable acceleration for at least one control axis of the machine associated with the commanded speed.

4. A method according to claim 1, wherein said controlling in step (c) further comprises the step of
   (c1) dividing a sum of commanded speed samples by an integral number of the commanded speed samples, the commanded speed samples including a sample of a most recent commanded speed and at least one sample of a previous commanded speed.

5. A method according to claim 2, wherein said controlling in step (c) further comprises the step of
   (c1) dividing a sum of commanded speed samples by an integral number of the commanded speed samples, the commanded speed samples including a sample of a most recent commanded speed and at least one sample of a previous commanded speed.

6. A method according to claim 3, wherein said controlling in step (c) further comprises the step of
   (c1) dividing a sum of commanded speed samples by an integral number of the commanded speed samples, the commanded speed samples including a sample of a most recent commanded speed and at least one sample of a previous commanded speed.

7. A method according to claim 4, wherein said controlling in step (c) further comprises the step of
   (c2) determining the integral number of commanded speed samples prior to said dividing in step (c1) by dividing the time constant varied in step (b) by the predetermined sampling period of said sampling in step (a).

8. A method according to claim 5, wherein said controlling in step (c) further comprises the step of
   (c2) determining the integral number of commanded speed samples prior to said dividing in step (c1) by dividing the time constant varied in step (b) by the predetermined sampling period of said sampling in step (a).

9. A method according to claim 6, wherein said controlling in step (c) further comprises the step of
   (c2) determining the integral number of commanded speed samples prior to said dividing in step (c1) by dividing the time constant varied in step (b) by the predetermined sampling period of said sampling in step (a).

10. A method for controlling acceleration and deceleration of at least one servomotor mounted to a machine, said method comprising the steps of:
    (a) sampling, at a predetermined sampling period, a commanded speed for the servomotor;
    (b) varying a time constant for acceleration/deceleration control by dividing the commanded speed sampled in step (a) by a predetermined maximum allowable acceleration/deceleration of the machine after the commanded speed is sampled in step (a); and
    (c) controlling acceleration/deceleration of the at least one servomotor in accordance with the time constant varied in step (b) and the commanded speed sampled in step (a) wherein said controlling in step (c) includes the step of (c1) dividing a sum of commanded speed samples by an integral number of the commanded speed samples, the commanded speed samples including a sample of a most recent commanded speed and at least one sample of a previous commanded speed.

11. A method according to claim 10, wherein said controlling in step (c) further comprises the step of (c2) determining an integral number of the commanded speed samples prior to said dividing in step (c1) by dividing the time constant varied in step (b) by the predetermined sampling period of said sampling in step (a).

* * * * *

UNITED STATES PATENT AND TRADEMARK OFFICE
CERTIFICATE OF CORRECTION

PATENT NO. : 5,004,968

DATED : April 2, 1991

INVENTOR(S) : Mizuno et al.

It is certified that error appears in the above-identified patent and that said Letters Patent is hereby corrected as shown below:

Title page Col. 1, after section "[87]" insert the following

--[30] FOREIGN APPLICATION PRIORITY DATA
Dec. 21, 1987 [JP] Japan ......62-321496--.

Title Page, Col. 2, "[57] Abstract, line 7, "a command" should be --a speed command--;

line 9, "able (Am)" should be --able acceleration/deceleration (Am)--;

line 16, "a" (second occurrence) should be --the--; "the" should be --a--.

Col. 3, line 34, "(not show)" should be --(not shown)--.

Col. 5, line 12, "et.," should be --etc.,--.

Signed and Sealed this

Tenth Day of November, 1992

Attest:

DOUGLAS B. COMER

*Attesting Officer*  Acting Commissioner of Patents and Trademarks